United States Patent [19]

Zediker et al.

[11] Patent Number: 5,790,300

[45] Date of Patent: Aug. 4, 1998

[54] MULTI-CHANNEL FIBER AMPLIFICATION SYSTEM AND ASSOCIATED METHOD

[75] Inventors: Mark Steven Zediker, Florissant; Robert Rex Rice, Chesterfield, both of Mo.

[73] Assignee: McDonnell Douglas Corporation, St. Louis, Mo.

[21] Appl. No.: 731,330

[22] Filed: Oct. 15, 1996

[51] Int. Cl.$^6$ .............................. H07F 7/00; H04B 9/00; H03F 7/05

[52] U.S. Cl. ..................... 359/334; 359/124; 359/341; 372/3; 372/6

[58] Field of Search ............................ 359/124, 133, 359/134, 327, 334, 341; 372/3, 6

[56] References Cited

U.S. PATENT DOCUMENTS

| | | | |
|---|---|---|---|
| 4,222,011 | 9/1980 | Kurnit | 359/334 |
| 4,720,684 | 1/1988 | Byron et al | 359/334 |
| 4,815,804 | 3/1989 | Desurvire et al | 359/124 |
| 5,323,404 | 6/1994 | Gruff | 372/6 |

OTHER PUBLICATIONS

E. Desurvire, M. Papuchon, J.P. Pocholle, J. Raffy, High-Gain Optical Amplification Of Laser Diode Signal By Raman Scattering In Single–Mode Fibres, *Electronics Letters*, vol. 19, No. 19, Sep. 15, 1983, pp. 751–753.

Takashi Nakashima, Shigeyuki Seikai, Masataka Nakazawa, Yukiyasu Negishi, Theoretical Limit Of Repeater Spacing In An Optical Transmission Line Utilizing Raman Amplification, *Journal Of Lightwave Technology*, vol. LT-4, No. 8, Aug. 1986, pp. 1267–1272.

N. Edagawa, K. Mochizuki, Y. Iwamoto, Simultaneous Amplification Of Wavelength–Division–Multiplexed Signals By A Highly Efficient Fibre Raman Amplifier Pumped By High–Power Semiconductor Lasers, *Electronics Letters*, vol. 23, No. 5, Feb. 26, 1987, pp. 196–197.

Yasuhiro Aoki, Properties Of Fiber Raman Amplifiers And Their Applicability To Digital Optical Communication Systems, *Journal Of Lightwave Technology*, vol. 6, No. 7, Jul. 1988, pp. 1225–1239.

Yasuhiro Aoki, Fibre Raman Amplifier Properties For Applications To Long–Distance Optical Communications, *Optical And Quantum Electronics*, vol. 21, 1989, pp. S89–S104.

Tsuneo Horiguchi, Toshiya Sato, Yahei Koyamada, Stimulated Raman Amplification Of 1.6–μm–Band Pulsed Light In Optical Fibers, *IEEE Photonics Technology Letters*, vol. 4, No. 1, Jan. 1992, pp. 64–66.

Senfar Wen, Sien Chi, Distributed Erbium–Doped Fiber Amplifiers With Stimulated Raman Scattering, *IEEE Photonics Technology Letters*, vol. 4, No. 2, Feb. 1992, pp. 189–192.

(List continued on next page.)

*Primary Examiner*—Nelson Moskowitz
*Attorney, Agent, or Firm*—Bell Seltzer Intellectual Property Group of Alston & Bird, LLP

[57] ABSTRACT

The multi-channel fiber amplification system and associated method includes a fiber amplifier which solves problems with power poaching by simultaneously amplifying a pair of optical signals in a similar manner even if the fiber amplifier is saturated. The fiber amplifier, has greater absorption than emission for wavelengths immediately less than a reference wavelength and greater emission than absorption for wavelengths immediately greater than the reference wavelength. The multi-channel fiber amplification system also includes a pump source having a Stokes band which includes at least some wavelengths greater than the reference wavelength of the fiber amplifier. The multi-channel fiber amplification system further includes first and second signal sources for providing first and second signals, respectively, having first and second wavelengths, respectively. The first and second wavelengths are both within the Stokes band of the pump source and are greater than the reference wavelength of the fiber amplifier such that the fiber amplifier simultaneously amplifies both the first and second signals by stimulated Raman scattering.

13 Claims, 2 Drawing Sheets

OTHER PUBLICATIONS

Emmanuel Desurvire, Gain, Saturation, and Noise Characteristics Of Erbium–Doped Fiber Amplifiers (Scattering Fiber Amplifiers), *Erbium–Doped Fiber Amplifiers Principles And Applications*, Copyright 1994, pp. 446–451.

Emmanuel Desurvire, Device Applications Of Erbium–Doped Fiber Amplifiers (Spectral Gain Equalization And Flattening), *Erbium–Doped Fiber Amplifiers Principles And Applications*, Copyright 1994, pp. 480–487.

Gruff, S. G., Leos '95, 8th Annu. Mtg., Oct. 31, 1995, vol. 2, pp. 69–70.

MULTI-CHANNEL FIBER AMPLIFICATION SYSTEM AND ASSOCIATED METHOD

FIELD OF THE INVENTION

The present invention relates generally to fiber amplifiers and associated amplification methods and, more particularly, to multi-channel fiber amplifiers and associated amplification methods.

BACKGROUND OF THE INVENTION

Large quantities of data are transmitted everyday over large distances via networks of optical fibers. While optical fibers transmit optical signals in an efficient manner, optical fibers attenuate the optical signals, at least somewhat. Thus, most optical communication systems include a number of repeaters spaced throughout the optical fiber network to amplify the optical signals, thereby compensating for the attenuation introduced by the optical fibers.

Primarily within the last decade, fiber amplifiers have been developed which both transmit and amplify the optical signals. As known to those skilled in the art, a fiber amplifier is pumped by a pump source, such as a diode laser or a quantum well laser, to at least partially invert the fiber amplifier. The power absorbed by the fiber amplifier from the pump source is then used to amplify the optical signals transmitted by the fiber amplifier. See, for example, Emmanuel Desurvire, Erbium-Doped Fiber Amplifiers Principles and Applications, John Wiley & Sons, Inc., New York (1994); Anders Bjarkleb, Optical Fiber Amplifiers: Design and System Applications, Artech House, Inc., Norwood, Mass. (1993).

A conventional fiber amplifier includes a optical fiber formed of silica ($SiO_2$) which has been doped with at least one rare earth element. As known to those skilled in the art, the rare earth elements include Lanthanum, Cerium, Praseodymium, Neodymium, Promethium, Samarium, Europium, Gadolinium, Terbium, Dysprosium, Holmium, Erbium, Thulium, Ytterbium and Lutetium. Fiber amplifiers are typically doped, however, with Neodymium, Erbium, Ytterbium or a combination of both Erbium and Ytterbium.

As also known to those skilled in the art, the performance of a fiber amplifier is defined by predetermined absorption and emission profiles based, at least in part, upon the type and concentration of the dopant. The absorption and emission profiles define the spectral absorption and emission characteristics of the fiber amplifier. In particular, the absorption profile defines the manner in which the fiber amplifier will absorb optical signals of various wavelengths. Likewise, the emission profile defines the manner in which the fiber amplifier will emit optical signals of various wavelengths. Thus, a fiber amplifier can be selected for a particular application based, at least in part, upon the wavelength(s) of the optical signals to be amplified.

One advantage of fiber amplifiers is the simultaneous amplification of optical signals of different wavelengths over a relatively broad spectral region. Thus, fiber amplifiers can simultaneously amplify two or more optical signals having different wavelengths. Typically, a fiber amplifier which simultaneously amplifies optical signals having different wavelengths is termed a multi-channel fiber amplifier in which the optical signals of each wavelength are designated as a respective channel.

Fiber amplifiers are increasingly being pumped at higher power levels in order to provide even more amplification of the optical signals. As a fiber amplifier is pumped at higher power levels, such as at power levels approaching 1 W per channel, the fiber amplifier will eventually saturate. Once saturated, a multi-channel fiber amplifier having ground state absorption, such as a fiber amplifier doped with Erbium or Ytterbium, will transfer power from the optical signals having the shorter wavelength to the optical signals having the longer wavelength. In particular, a saturated fiber amplifier having ground state absorption will absorb at least a portion of the power of the optical signal having the shorter wavelength and will reradiate this power at the longer wavelength, thereby further amplifying the optical signal having the longer wavelength while effectively attenuating the optical signal having the shorter wavelength. This shift in power from optical signals having shorter wavelengths to optical signals having longer wavelengths, currently referred to as "power poaching", has been found to be a fundamental limitation on the operation of saturated multi-channel fiber amplifiers having ground state absorption.

SUMMARY OF THE INVENTION

It is therefore an object of the present invention to provide a fiber amplification system and method which amplifies a plurality of optical signals having different respective wavelengths in a similar manner.

It is another object of the present invention to provide a multi-channel fiber amplification system and method which continues to provide relatively equal amplification to optical signals having different respective wavelengths even once the fiber amplifier has saturated.

These and other objects are provided, according to the present invention, by a multi-channel fiber amplification system and associated method which simultaneously amplifies a pair of optical signals in a similar manner. The fiber amplification system includes a fiber amplifier, such as a rare earth doped fiber amplifier, having predetermined absorption and emission characteristics. In particular, the fiber amplifier has greater absorption than emission for wavelengths immediately less than a reference wavelength and greater emission than absorption for wavelengths immediately greater than the reference wavelength. According to one advantageous embodiment, the fiber amplifier has predetermined absorption and emission profiles which relate the absorption and emission cross-sectional sizes, respectively, to wavelength. According to this embodiment, the absorption and emission profiles intersect at least one reference wavelength such that the absorption cross-sectional size is larger than the emission cross-sectional size for at least some wavelengths less than the reference wavelength and the emission cross-sectional size is larger than the absorption cross-sectional size for at least some wavelengths greater than the reference wavelength.

A multi-channel fiber amplification system also includes a pump source, optically connected to the fiber amplifier, for providing a pump signal for at least partially inverting the fiber amplifier. The pump source has a Stokes band which includes at least some wavelengths greater than the reference wavelength of the fiber amplifier for which the emission cross-sectional size is larger than the absorption cross-sectional size.

The multi-channel fiber amplification system also includes first and second signal sources, optically connected to the fiber amplifier, for providing first and second signals, respectively, having first and second wavelengths, respectively. According to the present invention, the first and second wavelengths are both within the Stokes band of the pump source and are greater than the reference wavelength of the fiber amplifier such that the fiber amplifier simultaneously amplifies both the first and second signals.

Since the first and second signals have respective wavelengths within the Stokes band of the pump source, the first and second signals are simultaneously amplified by stimulated Raman scattering. The stimulated Raman scattering is independent of the absorption and emission cross-sectional sizes of the absorption and emission profiles of the fiber amplifier and is therefore also independent of the ground state absorption of a saturated fiber amplifier. As a result, the multi-channel fiber amplification system and method of the present invention can simultaneously amplify first and second signals without preferentially amplifying the optical signal having the longer wavelength by poaching power from the optical signal having the shorter wavelength, even in instances in which the fiber amplifier is saturated.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
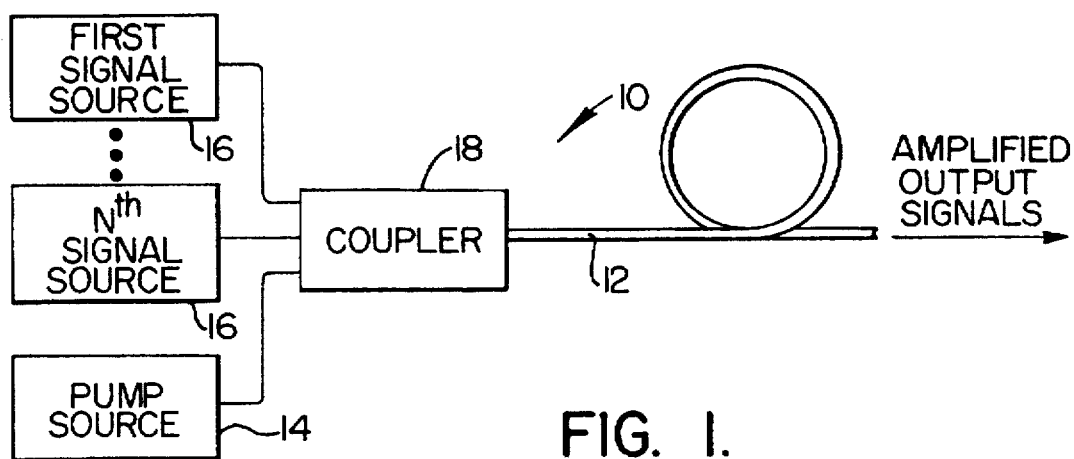
FIG. 1 is a schematic representation of a multi-channel fiber amplification system according to one embodiment of the present invention.

As shown schematically in FIG. 1, a multi-channel fiber amplification system 10 of one embodiment of the present invention includes a fiber amplifier 12, a pump source 14 and a plurality of signal sources 16. The pump source and the signal sources typically include laser diodes and quantum well lasers. However, the pump source and the signal sources can include other types of optical sources without departing from the spirit and scope of the present invention.

According to the present invention, the multi-channel fiber amplification system 10 includes at least two signal sources 16, namely, first and second signal sources for providing first and second signals, respectively, having first and second wavelengths, respectively. While the multi-channel fiber amplification system includes at least two signal sources, the multi-channel fiber amplification system of the present invention can include any number of signal sources for providing respective signals having different wavelengths without departing from the spirit and scope of the present invention.

The multi-channel fiber amplification system 10 also includes a coupler or combiner 18 for optically connecting the pump source 14 and the signal sources 16 to one end of the fiber amplifier 12. For example, the coupler can be a wavelength division multiplexor (WDM) coupler. Although not illustrated, the multi-channel fiber amplification system can also include one or more lenses, such as microlenses, and/or a launching fiber disposed between the coupler and the fiber amplifier in order to more particularly focus the pump signal and the first and second signals, thereby providing more efficient optical coupling.

The fiber amplifier 12 is preferably formed of an optical fiber which has been doped, such as with a rare earth element. For example, the fiber amplifier can be an $SiO_2$ optical fiber doped with a rare earth element, such as Neodymium, Erbium, Ytterbium or a combination of both Erbium and Ytterbium, such that the fiber amplifier has ground state absorption. However, the fiber amplifier can be doped with other elements, such as other rare earth elements, and can be doped with two or more elements without departing from the spirit and scope of the present invention.

Figure 2:
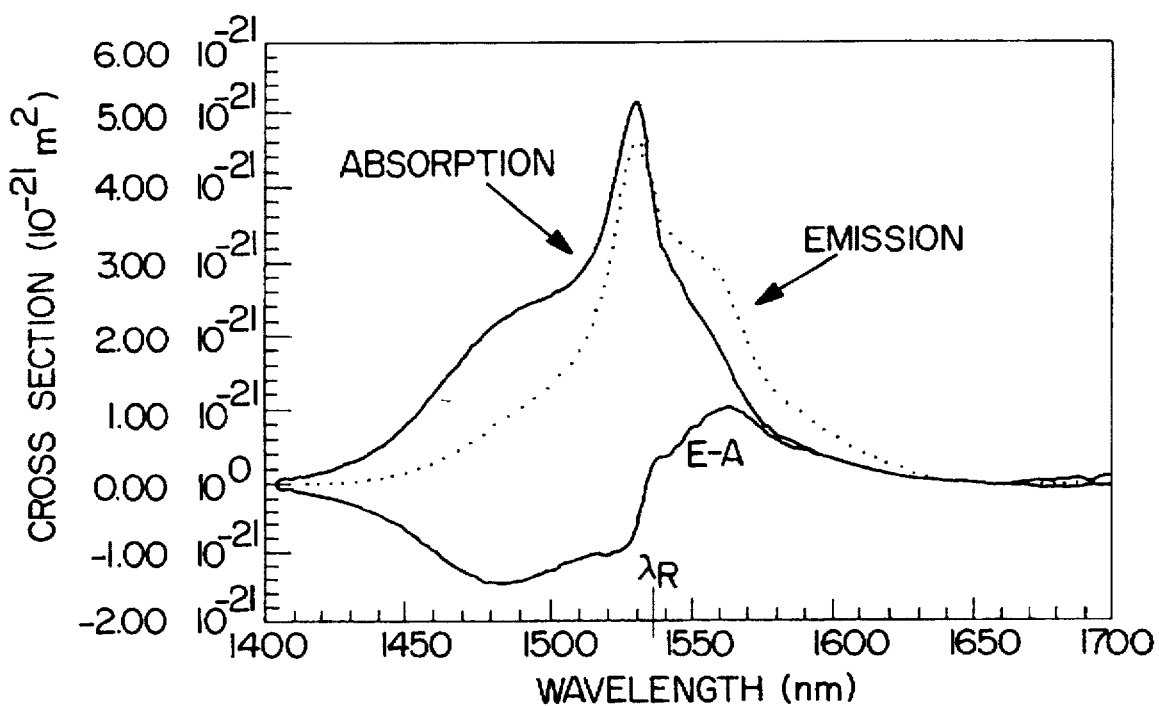
FIG. 2 is a graphical representation of the predetermined absorption and emission profiles of an Erbium-doped fiber amplifier.

Regardless of the specific embodiment of the fiber amplifier 12, the fiber amplifier has predetermined absorption and emission characteristics. The predetermined absorption and emission characteristics of a fiber amplifier are typically defined by a predetermined absorption and emission profiles. As shown in FIG. 2, the predetermined absorption and emission profiles define the relationship between the absorption and emission cross-sectional sizes, respectively, of the fiber amplifier and the wavelength of the signals transmitted by the fiber amplifier. For example, FIG. 2 depicts the absorption and emission profiles of a fiber amplifier doped with Erbium for wavelengths between 1400 nanometers and 1700 nanometers in solid and dashed lines, respectively. In addition, FIG. 2 illustrates the difference (E-A) between the emission and absorption cross-sectional sizes. While one example of the absorption and emission profiles of a suitable fiber amplifier is shown in FIG. 2, the fiber amplifier can be doped with other types or concentrations of dopants so as to have other predetermined absorption and emission profiles which are somewhat different in shape.

As shown in FIG. 2, the predetermined absorption and emission profiles are offset for a saturated fiber amplifier 12 and, more particularly, for a saturated fiber amplifier having ground state absorption. As such, the predetermined absorption and emission profiles of a saturated fiber amplifier intersect at at least one reference wavelength $\lambda_R$ such that the absorption and emission cross-sectional sizes are identical at the reference wavelength. For signals having a wavelength less than the reference wavelength, however, the saturated fiber amplifier has greater absorption than emission since the absorption cross-sectional size is larger than the emission cross-sectional size. Likewise, for signals having a wavelength greater than the reference wavelength, the saturated fiber amplifier has greater emission than absorption since the emission cross-sectional size is larger than the absorption cross-sectional size. During the development of the multi-channel fiber amplification system 10 and method of the present invention, it has been determined that the differences or offset between the absorption and emission profiles of a conventional, multi-channel, saturated fiber amplifier having ground state absorption lead to "power poaching" in which an optical signal having a longer wavelength is preferentially amplified by robbing an optical signal having a shorter wavelength of power.

In order to substantially reduce, if not eliminate, power poaching within a saturated fiber amplifier 12 having ground state absorption, the plurality of signal sources 16 and the pump source 14 of the multi-channel fiber amplification system 10 of the present invention are selected such that the optical signals emitted by the plurality of signal sources are within the Stokes band of the pump source. Since the optical signals preferably have a wavelength greater than the reference wavelength $\lambda_R$, the pump source is also selected such that the Stokes band includes at least some wavelengths greater than the reference wavelength of the fiber amplifier.

Figure 3:
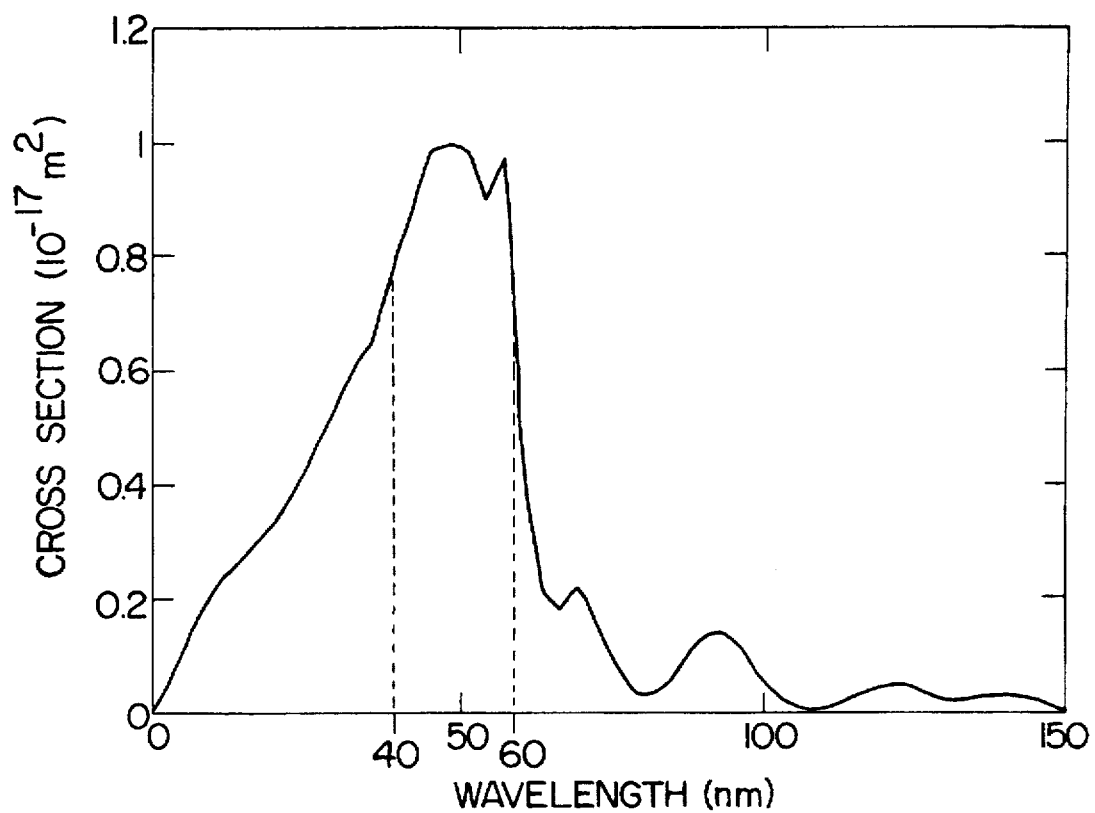
FIG. 3 is a graphical representation of the relative gain provided by the stimulated Raman scattering of a fiber amplifier within the Stokes band of a pump source.

As known to those skilled in the art and as shown in FIG. 3, the Stokes band of a pump source 14 includes a range of wavelengths which extends upward from the wavelength of the pump signal. For example, for a pump source adapted to pump an Erbium-doped fiber amplifier 12, the Stokes band extends from the wavelength of the pump signals (designated "0" in FIG. 3) to a wavelength approximately 150 nanometers greater than the wavelength of the pump signals. For signals having a wavelength within the Stokes band, the signals are amplified by stimulated Raman scattering in the manner illustrated by the cross-sectional profile of FIG. 3. Since the amplification provided by the stimulated Raman scattering is independent of the absorption and emission profiles of the fiber amplifier, the stimulated Raman scattering does not differentially amplify the optical signals according to the predetermined absorption and emission profiles. Instead, by appropriately selecting the wavelengths of the pump signal and the optical signals, the optical signals can be amplified in a similar manner even though the signals have different wavelengths, thereby preventing power poaching from the signal having the shorter wavelength.

The signal sources 16 of one advantageous embodiment preferably provide signals which will be amplified in a similar manner by stimulated Raman scattering. With reference to FIG. 3, the signal sources of one exemplary embodiment provide signals which have respective wavelengths which are approximately 40 nanometers to 60 nanometers greater than the wavelength of the pump signal such that each of the optical signals is amplified in a similar manner by stimulated Raman scattering. In order to further reduce power poaching created by differences between the absorption and emission profiles of a saturated fiber amplifier 12 having ground state absorption, the pump source 14 and the signal sources are preferably selected such that the optical signals have respective wavelengths at which the emission curve of the fiber amplifier is greater than the absorption curve, i.e., (E-A) is positive at each respective wavelength. With reference to FIGS. 2 and 3, for example, the signal sources can be selected to provide optical signals having respective wavelengths between 1600 nanometers and 1620 nanometers since the emission profile is greater than the corresponding absorption profile at each of these wavelengths. In order to insure that each optical signal of this exemplary embodiment is amplified in a similar fashion by stimulated Raman scattering, the pump source can be selected to provide pump signals having a wavelength of 1560 nanometers such that the optical signals have respective wavelengths approximately 40 nanometers to 60 nanometers greater than the wavelength of the pump signal. However, the signal sources and the pump source can provide signals having other wavelengths greater than the reference wavelength $\lambda_R$ without departing from the spirit and scope of the present invention.

Thus, the multi-channel fiber amplification system 10 and method of the present invention can amplify a plurality of signals in the same or a similar manner, even though the plurality of signals have different respective wavelengths. As a result, the multi-channel fiber amplification system and method of the present invention avoids the problems associated with power poaching. Typically, only saturated fiber amplifiers 12 having ground state absorption suffer from power poaching, such as fiber amplifiers doped with Erbium or Ytterbium which are operating at high power levels. Thus, even though the multi-channel fiber amplification system and method of the present invention is effective for amplifying optical signals having a variety of power levels, the multi-channel fiber amplification system and method of the present invention is particularly advantageous for amplifying optical signals having high power levels, such as greater than about 1 W per channel, since a fiber amplifier operating at these higher power levels is more likely to be saturated. If the fiber amplifier does suffer from ground state absorption and is saturated, however, the fiber amplification system and method of the present invention will effectively amplify the optical signals by stimulated Raman scattering, even if the optical signals are at lower power levels.

In the drawings and the specification, there has been set forth preferred embodiments of the invention and, although specific terms are employed, the terms are used in a generic and descriptive sense only and not for the purpose of limitation, the scope of the invention being set forth in the following claims.

That which is claimed is:

1. A multi-channel fiber amplification system for simultaneously amplifying at least two optical signals having different wavelengths, wherein the amplification system amplifies at least one of the optical signals to a power level greater than about 1 Watt without preferentially amplifying the optical signal having a longer wavelength in instances in which said amplification system is saturated by poaching power from the optical signal having a shorter wavelength, and wherein said amplification system comprises:

a saturable fiber amplifier having predetermined absorption and emission profiles, wherein the predetermined absorption and emission profiles relate absorption and emission cross-sectional sizes, respectively, to wavelength, and wherein the absorption and emission profiles intersect at least one reference wavelength such that the absorption cross-sectional size is larger than the emission cross-sectional size for at least some wavelengths less than the reference wavelength and such that the emission cross-sectional size is larger than the absorption cross-sectional size for at least some wavelengths greater than the reference wavelength;

a pump source, optically connected to said saturable fiber amplifier, for providing a pump signal, wherein said pump source is adapted to provide pump signals having sufficient power to saturate said saturable fiber amplifier and has a Stokes band which includes at least some wavelengths greater than the reference wavelength of said saturable fiber amplifier for which the emission cross-sectional size is larger than the absorption cross-sectional size; and first and second signal sources, optically connected to said saturable fiber amplifier, for providing first and second optical signals, respectively, wherein said first optical signal has a first wavelength and said second optical signal has a second wavelength which is shorter than said first wavelength, and wherein said first and second wavelengths are both within the Stokes band of said pump source and are greater than the reference wavelength of said saturable fiber amplifier such that said saturable fiber amplifier simultaneously amplifies both the first and second optical signals such that at least one of the optical signals is amplified to a power level greater than about 1 Watt without preferentially amplifying the first optical signal having the longer wavelength in instances in which said fiber amplifier is saturated by poaching power from the second optical signal having the shorter wavelength.

2. A multi-channel fiber amplification system according to claim 1 wherein said fiber amplifier is doped with at least one rare earth element.

3. A multi-channel fiber amplification system according to claim 2 wherein said fiber amplifier is doped with a rare earth element selected from a group consisting of Neodymium, Erbium, Ytterbium and a combination of both Erbium and Ytterbium.

4. A multi-channel fiber amplification system according to claim 1 wherein said fiber amplifier is saturated.

5. A multi-channel fiber amplification system for simultaneously amplifying at least two optical signals having different wavelengths, wherein the amplification system amplifies at least one of the optical signals to a power level treater than about 1 Watt without preferentially amplifying the optical signal having a longer wavelength in instances in which said amplification system is saturated by poaching power from the optical signal having a shorter wavelength, and wherein said amplification system comprises:

a saturable fiber amplifier having predetermined absorption and emission characteristics, wherein said saturable fiber amplifier has greater absorption than emission for wavelengths immediately less than a reference wavelength, and wherein said saturable fiber amplifier has greater emission than absorption for wavelengths immediately greater than the reference wavelength;

a pump source, optically connected to said saturable fiber amplifier, for providing a pump signal having a predetermined pump wavelength, wherein said pump source is adapted to provide pump signals having sufficient power to saturate said saturable fiber amplifier and has a Stokes band which includes at least some wavelengths greater than the reference wavelength and at which said saturable fiber amplifier has greater emission than absorption; and first and second signal sources, optically connected to said saturable fiber amplifier, for providing first and second optical signals, respectively, wherein said first optical signal has a first wavelength and said second optical signal has a second wavelength which is shorter than said first wavelength, and wherein said first and second wavelengths are both within the Stokes band of said pump source and are greater than the reference wavelength of said saturable fiber amplifier such that said saturable fiber amplifier simultaneously amplifies both the first and second optical signals such that at least one of the optical signals is amplified to a power level greater than about 1 Watt without preferentially amplifying the first optical signal having the longer wavelength in instances in which said fiber amplifier is saturated by poaching power from the second optical signal having the shorter wavelength.

6. A multi-channel fiber amplification system according to claim 5 wherein said fiber amplifier is doped with at least one rare earth element.

7. A multi-channel fiber amplification system according to claim 6 wherein said fiber amplifier is doped with a rare earth element selected from a group consisting of Neodymium, Erbium, Ytterbium and a combination of both Erbium and Ytterbium.

8. A multi-channel fiber amplification system according to claim 5 wherein said fiber amplifier is saturated.

9. A method of simultaneously amplifying at least two optical signals having different wavelengths, wherein the amplification method amplifies at least one of the optical signals to a power level greater than about 1 Watt without preferentially amplifying the optical signal having a longer wavelength by poaching power from the optical signal having a shorter wavelength, and wherein said amplification method comprises the steps of:

providing a saturable fiber amplifier having predetermined absorption and emission characteristics, wherein the saturable fiber amplifier has greater absorption than emission for wavelengths immediately less than a reference wavelength, and wherein the saturable fiber amplifier has greater emission than absorption for wavelengths immediately greater than the reference wavelength;

pumping the saturable fiber amplifier with a pump signal, wherein said pumping step comprises pumping the saturable fiber amplifier with a pump signal with sufficient power to saturate the fiber amplifier, and wherein the pump signal is provided by a pump source having a Stokes band which includes at least some wavelengths greater than the reference wavelength and at which the saturable fiber amplifier has greater emission than absorption;

providing first and second optical signals to the saturable fiber amplifier during said pumping step, wherein said providing step comprises providing first and second optical signals wherein said first optical signal has a first wavelength and said second optical signal has a second wavelength which is shorter than said first wavelength, and wherein said first and second wavelengths are both within the Stokes band of the pump source and are greater than the reference wavelength of the saturable fiber amplifier; and simultaneously amplifying both the first optical signal and the second optical signal within the saturable fiber amplifier such that at least one of the optical signals is amplified to a power level greater than about 1 Watt without preferentially amplifying the first optical signal having the longer wavelength in instances in which the fiber amplifier is saturated by poaching power from the second optical signal having the shorter wavelength.

10. A method according to claim 9 wherein said simultaneously amplifying step comprises simultaneously amplifying both the first and second signals via stimulated Raman scattering.

11. A method according to claim 9 wherein said step of providing a fiber amplifier comprises providing a fiber amplifier doped with at least one rare earth element.

12. A method according to claim 11 wherein said step of providing a fiber amplifier comprises providing a fiber amplifier doped with a rare earth element selected from a group consisting of Neodymium, Erbium, Ytterbium and a combination of both Erbium and Ytterbium.

13. A method according to claim 9 wherein said step of providing a fiber amplifier comprises providing a saturated fiber amplifier.

* * * * *

UNITED STATES PATENT AND TRADEMARK OFFICE
CERTIFICATE OF CORRECTION

PATENT NO. : 5,790,300
DATED : August 4, 1998
INVENTOR(S) : Zediker, et al.

It is certified that error appears in the above-identified patent and that said Letters Patent is hereby corrected as shown below:

On the title page, item [56]:

In the References Cited, U.S. PATENT DOCUMENTS, for Patent No. 4,720,684, the inventor's name "Byron et al" should be --Byron--; Patent No. 5,323,404, the inventor's name "Gruff" should be --Grubb--.

In the ABSTRACT, line 5, after amplifier omit the comma (,).

In the References Cited, OTHER PUBLICATIONS, 2nd column on page 2, line 5, "Gruff" should be --Grubb--; 'insert omitted publication reference --X.Y.Zou, S.M. Hwang, A.E. Willner, *Compensation of Raman Scattering and EDFA's Nonuniform Gain in Ultra-Long-Distance WDM Links*, IEEE Photonics Technology Letters, January 1996, pp. 139-41--.

Column 7, line 12, "treater" should be --greater--.

Signed and Sealed this

Sixth Day of October, 1998

Attest:

BRUCE LEHMAN

Attesting Officer

*Commissioner of Patents and Trademarks*